UNITED STATES PATENT OFFICE.

GADIENT ENGI, OF BASEL, SWITZERLAND, ASSIGNOR TO SOCIETY OF CHEMICAL INDUSTRY IN BASLE, OF BASEL, SWITZERLAND.

VAT DYESTUFFS OF THE INDIGO SERIES AND PROCESS OF MAKING SAME.

1,074,850.      Specification of Letters Patent.      Patented Oct. 7, 1913.

No Drawing.      Application filed May 8, 1912. Serial No. 695,880.

*To all whom it may concern:*

Be it known that I, GADIENT ENGI, doctor of philosophy and chemist, a citizen of the Swiss Republic, and resident of Basel, Switzerland, have invented new and useful Vat Dyestuffs of the Indigo Series and Process of Making Same, of which the following is a full, clear, and exact specification.

In the United States Letters Patent No. 997766 dated July 11th 1911 are described halogenated vat dyestuffs obtained by halogenating the condensation products described in the United States Letters Patent No. 994988 dated June 13th 1911, resulting from the action of the haloids of aromatic acids on indigo compounds. I have now found that the said halogenated vat-dyestuffs, which dye animal and vegetable fibers from an alkaline vat pure greenish yellow tints, can be transformed into new reddish yellow to orange yellow vat dye-stuffs, by treating the same with reduced agents, especially sulfhydrates, hydrosulfites and the like, in absence of caustic alkalis and preferably in presence of an organic medium mixable with water.

Example I: 20 parts of the dyestuff obtained by brominating the condensation product of indigo with benzoyl-chlorid are suspended in a finely pulverized state in 200 parts of alcohol and heated to ebullition in an apparatus provided with a reflux cooler and hereafter 60 parts of a solution of sodium sulfhydrate of 48 per cent. NaHS are added. The mixture is boiled for about 1 to 2 hours and poured slowly into water of 50 to 60° C.; the thus separating dyestuff is filtered off. Dried the new dyestuff forms a deep orange powder, scarcely soluble in cold alcohol and difficultly soluble in hot alcohol. In cold nitrobenzene it dissolves easily with a yellow-brown coloration. Its solution in concentrated sulfuric acid has an intense red-brown color and yields by addition of water a yellow-orange precipitate. Fuming sulfuric acid dissolves it with a deep brown coloration; hereby a partial sulfonation of the product takes place, the solution diluted with ice-water showing an intense yellow coloration. By treating the dyestuff with hydrosulfite and caustic alkali a wine-red vat is obtained which dyes vegetable and animal fibers reddish yellow tints of excellent fastness. After exposure to air the so obtained dyeings are subjected to a treatment with hot baths (for instance a soap bath for cotton and hot dilute acids for wool), whereby the tints become some more pure and more vivid. The same effect can be produced by treating the dyeings with chlorin.

Example II: 10 parts of the brominated condensation product specified in Example I, 100 parts of alcohol, 10 parts of sodium hydrosulfite and 12 parts of water are boiled together for 5 to 6 hours. After cooling, the mass is filtered and the residue remaining on the filter is washed at first with alcohol and afterward with water and finally dried. The dyestuff thus obtained constitutes an orange-brown powder dyeing textile fibers from an alkaline vat reddish yellow tints.

Instead of alcohol any other organic liquid mixable with water can be employed in the foregoing examples and the sodium sulfhydrate or hydrosulfite can be replaced by any other reducing agent having the same action.

What I claim is:

1. The described process for the manufacture of new reddish yellow vat dyestuffs of the indigo series consisting in treating a halogenated derivative of the condensation product resulting from a haloid of an aromatic acid and an indigo compound with reducing agents in absence of caustic alkalis.

2. The described process for the manufacture of new reddish yellow vat dyestuffs of the indigo series consisting in treating a halogenated derivative of the condensation product resulting from a haloid of an aromatic acid and an indigo compound, with reducing agents in absence of caustic alkalis and in presence of an organic diluent mixable with water.

3. As new products the vat dyestuffs of the indigo series obtained by reducing the halogenated derivatives of the condensation products resulting from the haloids of aromatic acids and indigo compounds, in absence of caustic alkalis forming in dry state orange to orange-brown powders insoluble in water, difficultly soluble in hot alcohol, more easily soluble in hot nitrobenzene with a brownish yellow color, dissolving in concentrated sulfuric acid to reddish brown solutions from which, on addition of ice-water, the unaltered dyestuff is precipitated in the form of yellowish orange flakes, yielding by treating with caustic alkali and hydrosulfite a wine-red colored vat, from which textile fibers are dyed in reddish yellow shades fast to washing, light and chlorin.

In witness whereof I have hereunto signed my name this 26th day of April 1912, in the presence of two subscribing witnesses.

GADIENT ENGI.

Witnesses:
 GEO. GIFFORD,
 AMAND RITTER.